United States Patent
Török et al.

[11] Patent Number: 6,140,731
[45] Date of Patent: Oct. 31, 2000

[54] SELF-STARTING BRUSHLESS ELECTRIC MOTOR

[75] Inventors: Vilmos Török, Campione D'Italia, Italy; Walter Wissmach, München, Germany; Roland Schaer, Grabs, Sweden

[73] Assignee: Vilmos Trörok, Campione d'Italia, Switzerland

[21] Appl. No.: 09/194,541

[22] PCT Filed: May 29, 1997

[86] PCT No.: PCT/SE97/00930

§ 371 Date: Nov. 30, 1998

§ 102(e) Date: Nov. 30, 1998

[87] PCT Pub. No.: WO97/45944

PCT Pub. Date: Dec. 4, 1997

[30] Foreign Application Priority Data

May 30, 1996 [SE] Sweden .................................. 9602119

[51] Int. Cl.$^7$ ................................................. H02K 37/02
[52] U.S. Cl. ........................... 310/181; 310/168; 310/254
[58] Field of Search ................................. 310/181, 49 R, 310/254, 261, 264, 269, 168

[56] References Cited

U.S. PATENT DOCUMENTS

| | | | |
|---|---|---|---|
| 4,348,605 | 9/1982 | Torok | 310/168 |
| 4,672,253 | 6/1987 | Tajima et al. | 310/269 |
| 5,117,144 | 5/1992 | Torok | 310/269 |
| 5,345,131 | 9/1994 | Torok | 310/181 |
| 5,548,173 | 8/1996 | Stephenson | 310/181 |
| 5,672,925 | 9/1997 | Lipo et al. | 310/154 |
| 5,825,112 | 10/1998 | Lipo et al. | 310/181 |

FOREIGN PATENT DOCUMENTS

| | | |
|---|---|---|
| WO 90/02437 | 3/1990 | WIPO . |
| WO 92/12567 | 7/1992 | WIPO . |
| WO 96/38903 | 12/1996 | WIPO . |

*Primary Examiner*—Nestor Ramirez
*Assistant Examiner*—Tran N Nguyen
*Attorney, Agent, or Firm*—Browdy and Neimark

[57] ABSTRACT

A frame conveyed across the network is divided into a plurality of segments with an identical number of bits. All of the bits of a segment are received simultaneously, with each segment of the frame being received sequentially. Very often, the number of bits in the entire frame, will not be an integer multiple of the number of bits in the segment. Therefore the bits of the frame can be unevenly divided into the plurality of segments. The present invention detects the number of bits from the frame that are present in each of the segments, or at least the number of bits of the frame present in the last segment. An FCS function is used to create a segment FCS function which operates on all the bits of a segment at one time. The original FCS function is preferably an 8 bit function, which combines a present 8 bit word with the FCS calculated for previous 8 bit word in order to generate a new FCS for the present 8 bit word and all previous 8 bit words. By combining all the equations that would normally be required for all the 8 bit words in a segment, a segment FCS function is created which removes many redundant terms. Each segment is combined with a previous intermediate or segment FCS, to create a new intermediate FCS for the present segment and all previous segments. Subsegment FCS functions are also determined for each of all possible numbers of frame bits that are possible in a segment. The number of frame bits is detected and the corresponding subsegment FCS function is used.

19 Claims, 5 Drawing Sheets

SELF-STARTING BRUSHLESS ELECTRIC MOTOR

FIELD OF THE INVENTION

The present invention relates to computer networks where calculations are performed on the individual bits of data to determine if an error has occurred during transmission of the data from one device to another. In particular, the present invention relates to a particular method and device for calculating a Frame Check Sequence (FCS) for a frame transmitted across a computer network.

BACKGROUND OF THE INVENTION

Many different types of error checking methods are known. One of the earliest methods is known as a parity check. This requires that each frame of data transmitted across the computer network must have an even number of bits representing the "1" state. All frames sent across the computer network with this system have a parity bit. If a transmitter was to send a frame that had an odd number of 1's, the transmitter would set the parity bit to 1, in order to have the total number of 1's in the frame be equal to an even number. If the transmitter was to send a frame that already had an even number of 1's, the parity bit was set to zero.

When a frame was received, the receiver would count the number of 1's in the frame. If the number of 1's was odd, the receiver knew an error had occurred. If the number of 1's in the received frame was even, the receiver assumed the frame had been received correctly.

While this method of parity checking provides detection of many types of errors, it will not detect all errors occurring during the transmission of a frame. More sophisticated methods have become known to detect a greater number of the different types of errors that are possible. These methods are known as Frame Check Sequences (FCS), and specific information for the type of FCS used in the present invention can be found in the American National Standard for Advanced Data Communication Control Procedures (ADCCP), ANSI X3.66-1979 (Section 12 & Appendix D), and Telecommunications; Synchronous Bit Orientated Data Link Control Procedures (Advanced Data Communications Control Procedures), FED-STD-1003A, available from GSA specification section, 7&D Street, S.W. Washington D.C. 20407, hereby incorporated by reference. These standards analyze the data in a frame, and generate a 32 bit FCS value. This FCS value is then either added to the frame, or checked with the FCS value already present in the frame.

These standards rely on data being transmitted in 8 bit words also known as bytes. All calculations are therefore done with 8 bits of the frame at a time.

Networks are being required to handle ever increasing amounts of data, with faster transmission of data being always beneficial. The calculating of the FCS, is required for each frame that is transmitted and received, and is very important to the operation of the network. The FCS is a significant burden and hinderance to increasing the speed of transmitting large amounts of data over a network.

SUMMARY AND OBJECTS OF THE INVENTION

It is a primary object of the present invention to provide a method and apparatus for generating an FCS in a computer network capable of transmitting data at high data rates.

The present invention accomplishes this objective by dividing the frame conveyed across the network into a plurality of segments, where each segment has an identical number of bits. The number of bits of each segment is greater than 8, and is preferably an integer multiple of 8. All of the bits of a segment are received simultaneously, with each segment of the frame being received sequentially. In this way several bytes can be transmitted and received simultaneously thus greatly increasing the data rate. Very often, the number of bits in the entire frame, will not be an integer multiple of the number of bits in the segment. Therefore the bits of the frame can be unevenly divided into the plurality of segments. The present invention detects the number of bits from the frame that are present in each of the segments, or at least the number of bits of the frame present in the last segment.

An FCS function which operates on 8 bits at a time, is used to create a segment FCS function which operates on all the bits of a segment at one time. The original FCS function is preferably an 8 bit function, which combines a present 8 bit word with the FCS calculated for the previous 8 bit word in order to generate a new FCS for the present 8 bit word and all previous 8 bit words. By combining all the equations that would normally be required for all the 8 bit words in a segment, a segment FCS function is created which removes many redundant terms, and which causes many terms to cancel out. By operating on a complete segment at a time, many redundant calculations are avoided and this further increases the speed for calculating an FCS. Each segment is combined with a previous intermediate or segment FCS, to create a new intermediate FCS for the present segment and all previous segments. This combining is continued until the last segment, with the final FCS calculated being the frame FCS.

Speed is increased, not only due to the parallel processing of several 8 bit words at one time, but also due to a more efficient FCS function which removes redundant terms and causes terms to cancel out. Thus less calculations need to be done in the present invention, than would need to be done when operating on 8 bits at a time.

A plurality of sub segment FCS functions are also provided. Each of these functions operate on a different number of bits of a segment. In the preferred embodiment, the number of bits in the segment, and the number of bits in the frame, are an integer multiple of 8. Therefore the number of frame bits in the segment will also be an integer number of 8. Sub segment FCS functions are created in the same manner as the segment FCS function, but for each of the integer multiples of 8 possible in the segment.

The number of frame bits in the segment are detected, and the corresponding FCS function operates on the segment. Alternatively, all of the FCS functions can operate simultaneously on the segment, and the output of the FCS function corresponding to the number of frame bits in the segment, is used. Outputs of all other FCS functions are ignored.

The FCS calculated for the frame, is then either checked with the FCS present in the frame, to determine if there was an error during transmission of the frame, or if the frame does not have an FCS, the FCS is added to the frame. The generation of the FCS of the present invention is preferably used with FDDI and Ethernet.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the figures, and especially FIG. 1, the present invention is based on an 8 bit FCS function 1. The FCS 8 bit function 1 receives an 8 bit data word 3 which has individual datain bits 5. The 8 bit FCS function 1 also cooperates with an FCS memory or storage 7 which also has individual FCS bits 9. There are 8 datain bits, and the FCS is 32 bits. The 8 bit FCS function 1 receives the datain bits 5 and the FCS bits 9 as inputs, and then combines the inputs to form a new FCS from port 11. This new FCS value is placed into FCS storage 7. When the next data word is available, the 8 bit FCS function 1 combines the new data word 3 with the new FCS value 7 and calculates another new FCS value on port 11. The new FCS value is then the FCS value for the present data word, and the previous data word. The 8 bit FCS function 1 continues to calculate FCS values for all of the data words of the frame. Once all the data words of the frame have been calculated by the 8 bit FCS function 1, the final FCS value 7 is the FCS value for the entire frame. The final FCS value is then compared against the FCS value in the frame to determine if any errors have been introduced into the frame. If there is no FCS value in the frame, the final FCS value is added to the frame so that another receiving station can determine if errors have been introduced.

When the initial data word 3 is first used by the 8 bit FCS function 1, the FCS value in the FCS storage 7 is set to a default value, preferably all 1's.

The calculations for the 8 bit FCS function 1 are as follows, where "xor" is the logical function "exclusive or", FCS0 is the previous FCS value 7 and FCS1 is the present or newly calculated FCS value 11, FIG. 1, and datain is data word 3:

FCS1(31)=datain(5) xor FCS0(23) xor FCS0(29)

FCS1(30)=datain(4) xor datain(7) xor FCS0(22) xor FCS0(28) xor FCS0(31)

FCS1(29)=datain(3) xor datain(6) xor datain(7) xor FCS0(21) xor FCS0(27) xor FCS0(30) xor FCS0(31)

FCS1(28)=datain(2) xor datain(5) xor datain(6) xor FCS0(20) xor FCS0(26) xor FCS0(29) xor FCS0(30)

FCS1(27)=datain(1) xor datain(4) xor datain(5) xor datain(7) xor FCS0(19) xor FCS0(25) xor FCS0(28) xor FCS0(29) xor FCS0(31);

FCS1(26)=datain(0) xor datain(3) xor datain(4) xor datain(6) xor FCS0(18) xor FCS0(24) xor FCS0(27) xor FCS0(28) xor FCS0(30);

FCS1(25)=datain(2) xor datain(3) xor FCS0(17) xor FCS0(26) xor FCS0(27)

FCS1(24)=datain(1) xor datain(2) xor datain(7) xor FCS0(16) xor FCS0(25) xor FCS0(26) xor FCS0(31)

FCS1(23)=datain(0) xor datain(1) xor datain(6) xor FCS0(15) xor FCS0(24) xor FCS0(25) xor FCS0(30)

FCS1(22)=datain(0) xor FCS0(14) xor FCS0(24)

FCS1(21)=datain(5) xor FCS0(13) xor FCS0(29)

FCS1(20)=datain(4) xor FCS0(12) xor FCS0(28)

FCS1(19)=datain(3) xor datain(7) xor FCS0(11) xor FCS0(27) xor FCS0(31)

FCS1(18)=datain(2) xor datain(6) xor datain(7) xor FCS0(10) xor FCS0(26) xor FCS0(30) xor FCS0(31)

FCS1(17)=datain(1) xor datain(5) xor datain(6) xor FCS0(9) xor FCS0(25) xor FCS0(29) xor FCS0(30)

FCS1(16)=datain(0) xor datain(4) xor datain(5) xor FCS0(8) xor FCS0(24) xor FCS0(28) xor FCS0(29)

FCS1(15)=datain(3) xor datain(4) xor datain(5) xor datain(7) xor FCS0(7) xor FCS0(27) xor FCS0(28) xor FCS0(29) xor FCS0(31)

FCS1(14)=datain(2) xor datain(3) xor datain(4) xor datain(6) xor datain(7) xor FCS0(6) xor FCS0(26) xor FCS0(27) xor FCS0(28) xor FCS0(30) xor FCS0(31)

FCS1(13)=datain(1) xor datain(2) xor datain(3) xor datain(5) xor datain(6) xor datain(7) xor FCS0(5) xor FCS0(25) xor FCS0(26) xor FCS0(27) xor FCS0(29) xor FCS0(30) xor FCS0(31)

FCS1(12)=datain(0) xor datain(1) xor datain(2) xor datain(4) xor datain(5) xor datain(6) xor FCS0(4) xor FCS0(24) xor FCS0(25) xor FCS0(26) xor FCS0(28) xor FCS0(29) xor FCS0(30)

FCS1(11)=datain(0) xor datain(1) xor datain(3) xor datain(4) xor FCS0(3) xor FCS0(24) xor FCS0(25) xor FCS0(27) xor FCS0(28)

FCS1(10)=datain(0) xor datain(2) xor datain(3) xor datain(5) xor FCS0(2) xor FCS0(24) xor FCS0(26) xor FCS0(27) xor FCS0(29)

FCS1(9)=datain(1) xor datain(2) xor datain(4) xor datain(5) xor FCS0(1) xor FCS0(25) xor FCS0(26) xor FCS0(28) xor FCS0(29)

FCS1(8)=datain(0) xor datain(1) xor datain(3) xor datain(4) xor FCS0(0) xor FCS0(24) xor FCS0(25) xor FCS0(27) xor FCS0(28)

FCS1(7)=datain(0) xor datain(2) xor datain(3) xor datain(5) xor datain(7) xor FCS0(24) xor FCS0(26) xor FCS0(27) xor FCS0(29) xor FCS0(31)

FCS1(6)=datain(1) xor datain(2) xor datain(4) xor datain(5) xor datain(6) xor datain(7) xor FCS0(25) xor FCS0(26) xor FCS0(28) xor FCS0(29) xor FCS0(30) xor FCS0(31)

FCS1(5)=datain(0) xor datain(1) xor datain(3) xor datain(4) xor datain(5) xor datain(6) xor datain(7) xor FCS0(24) xor FCS0(25) xor FCS0(27) xor FCS0(28) xor FCS0(29) xor FCS0(30) xor FCS0(31)

FCS1(4)=datain(0) xor datain(2) xor datain(3) xor datain(4) xor datain(6) xor FCS0(24) xor FCS0(26) xor FCS0(27) xor FCS0(28) xor FCS0(30)

FCS1(3)=datain(1) xor datain(2) xor datain(3) xor datain(7) xor FCS0(25) xor FCS0(26) xor FCS0(27) xor FCS0(31)

FCS1(2)=datain(0) xor datain(1) xor datain(2) xor datain(6) xor datain(7) xor FCS0(24) xor FCS0(25) xor FCS0(26) xor FCS0(30) xor FCS0(31)

FCS1(1)=datain(0) xor datain(1) xor datain(6) xor datain(7) xor FCS0(24) xor FCS0(25) xor FCS0(30) xor FCS0(31)

FCS1(0)=datain(0) xor datain(6) xor FCS0(24) xor FCS0(30)

Figure 1A:
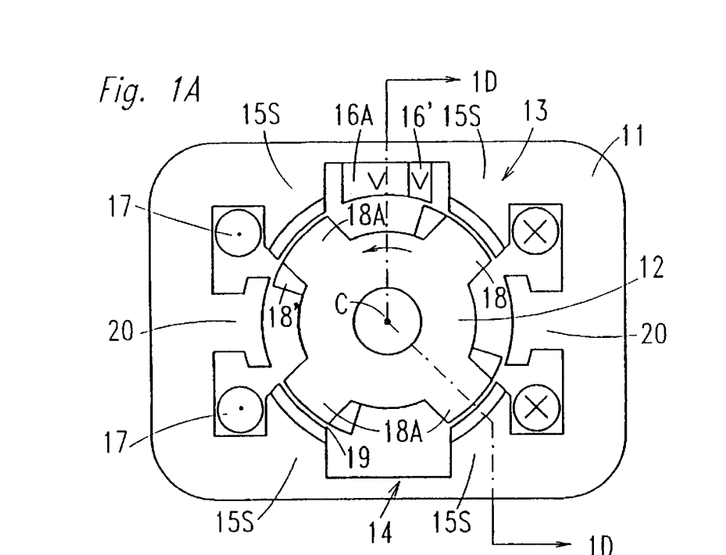
FIG. 1 is a schematic diagram of the operation of an 8 bit FCS function.
Figure 1B:
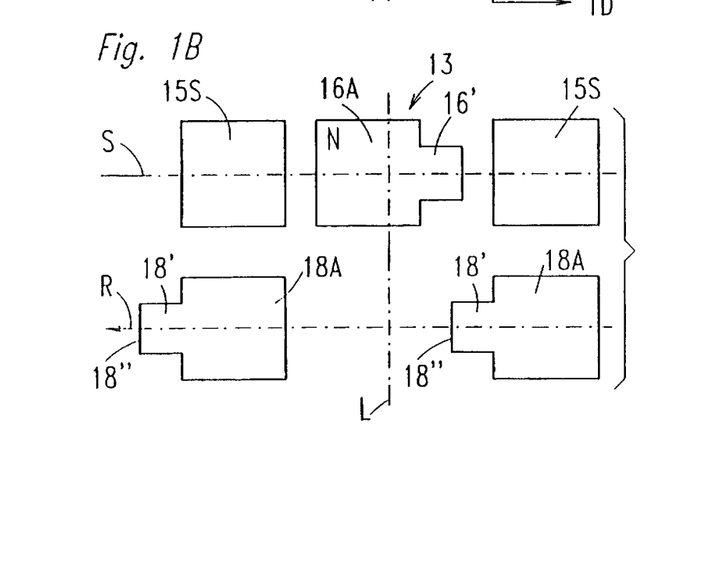
Figure 1C:
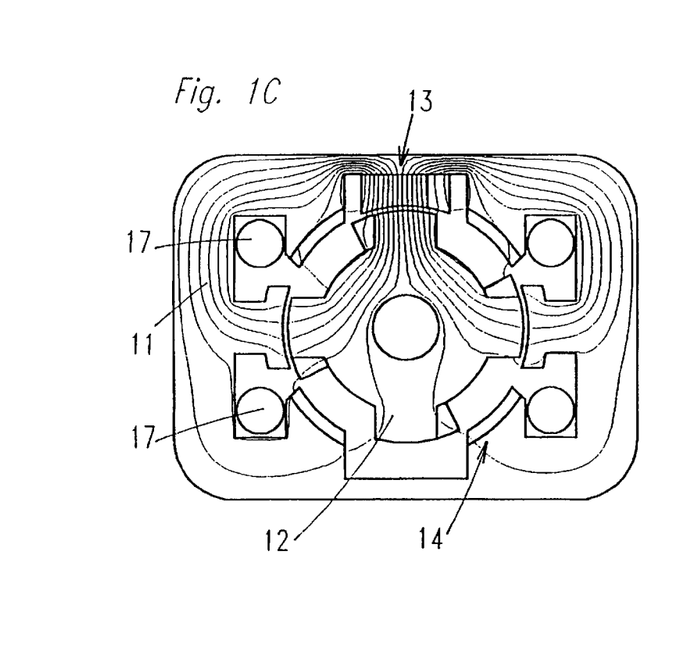
Figure 1D:
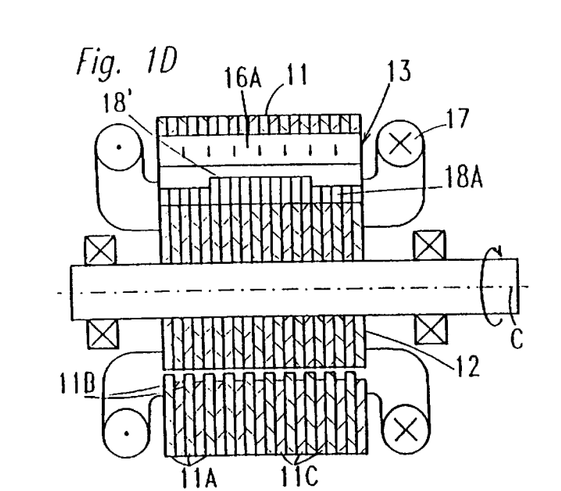
Figure 1E:
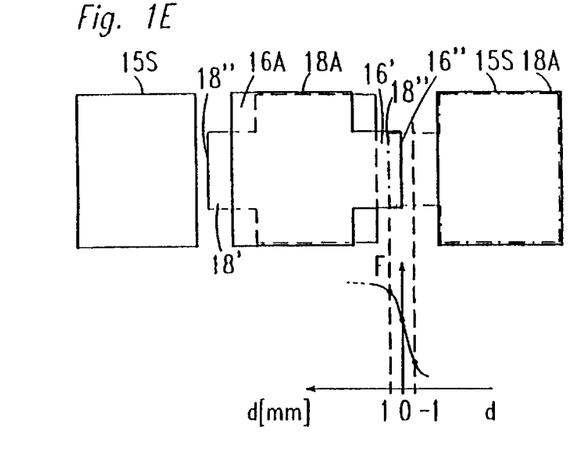
Figure 2A:
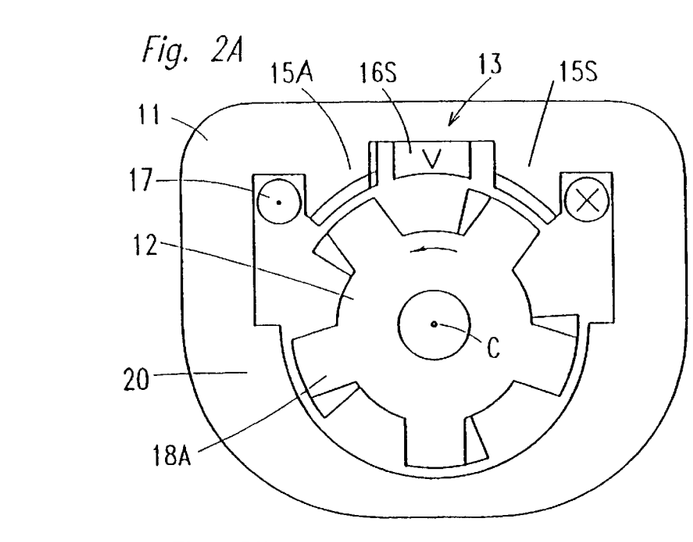
FIG. 2 is a schematic diagram of the receiving of the segments.
Figure 2B:
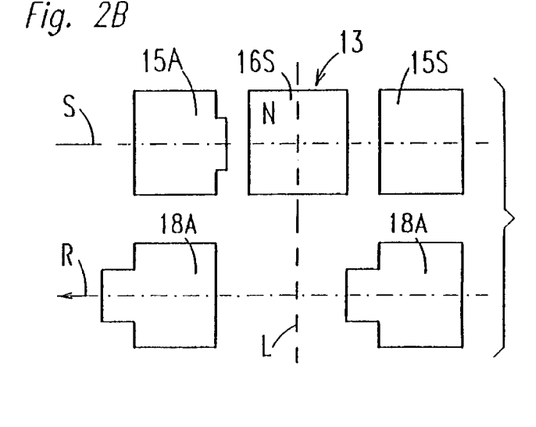

In the preferred embodiment as shown in FIG. 2, each frame 13 is divided into a plurality of segments 15, where each segment 15 has 32 segment bits 17. If the number of bits in the frame 13 is not an integer multiple of 32, the last segment 15 is not completely filled. All the segment bits 17 of a segment 15 are received simultaneously by a receiver means 19. Throughout the present invention, all the segment bits 17 are operated on at the same time, and in a batch type operation.

Figure 3A:
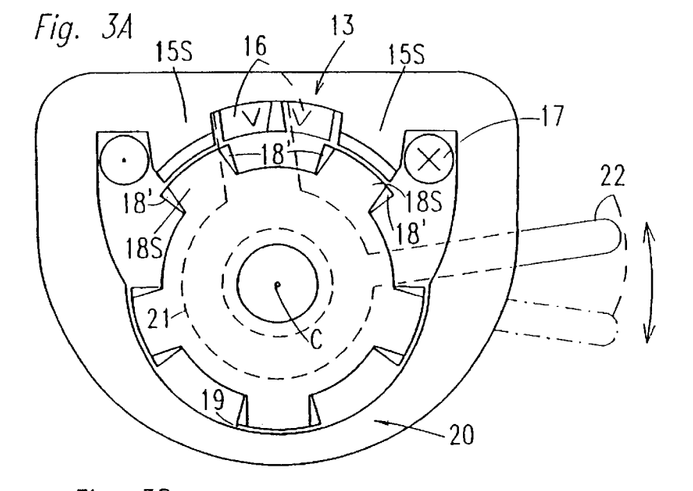
FIG. 3 is a schematic diagram of a 32 bit FCS function.
Figure 3B:
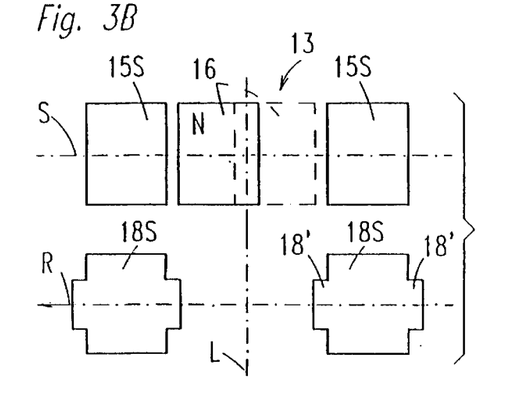

The present invention therefore includes a segment FCS function 21 as shown in FIG. 3. The entire segment 15 is fed to the segment FCS function 21, and all the segment bits 17 are received by the segment FCS function 21 at the same time.

In order to determine the segment FCS function 21, the 8 bit FCS function equations are applied to the first 8 bits, datain (31–24) of the segment 15. These equations are the same as the equations previously presented with the difference that the datain values are datain (24–31) instead of datain (0–7). The equations with datain (24–31) are repeated below.

FCS1(31)=datain(29) xor FCS0(23) xor FCS0(29)

FCS1(30)=datain(28) xor datain(31) xor FCS0(22) xor FCS0(28) xor FCS0(31)

FCS1(29)=datain(27) xor datain(30) xor datain(31) xor FCS0(21) xor FCS0(27) xor FCS0(30) xor FCS0(31)

FCS1(28)=datain(26) xor datain(29) xor datain(30) xor FCS0(20) xor FCS0(26) xor FCS0(29) xor FCS0(30)

FCS1(27)=datain(25) xor datain(28) xor datain(29) xor datain(31) xor FCS0(19) xor FCS0(25) xor FCS0(28) xor FCS0(29) xor FCS0(31)

FCS1(26)=datain(24) xor datain(27) xor datain(28) xor datain(30) xor FCS0(18) xor FCS0(24) xor FCS0(27) xor FCS0(28) xor FCS0(30)

FCS1(25)=datain(26) xor datain(27) xor FCS0(17) xor FCS0(26) xor FCS0(27)

FCS1(24)=datain(25) xor datain(26) xor datain(31) xor FCS0(16) xor FCS0(25) xor FCS0(26) xor FCS0(31)

FCS1(23)=datain(24) xor datain(25) xor datain(30) xor FCS0(15) xor FCS0(24) xor FCS0(25) xor FCS0(30)

FCS1(22)=datain(24) xor FCS0(14) xor FCS0(24)

FCS1(21)=datain(29) xor FCS0(13) xor FCS0(29)

FCS1(20)=datain(28) xor FCS0(12) xor FCS0(28)

FCS1(19)=datain(27) xor datain(31) xor FCS0(11) xor FCS0(27) xor FCS0(31)

FCS1(18)=datain(26) xor datain(30) xor datain(31) xor FCS0(10) xor FCS0(26) xor FCS0(30) xor FCS0(31)

FCS1(17)=datain(25) xor datain(29) xor datain(30) xor FCS0(9) xor FCS0(25) xor FCS0(29) xor FCS0(30)

FCS1(16)=datain(24) xor datain(28) xor datain(29) xor FCS0(8) xor FCS0(24) xor FCS0(28) xor FCS0(29)

FCS1(15)=datain(27) xor datain(28) xor datain(29) xor datain(31) xor FCS0(7) xor FCS0(27) xor FCS0(28) xor FCS0(29) xor FCS0(31)

FCS1(14)=datain(26) xor datain(27) xor datain(28) xor datain(30) xor datain(31) xor FCS0(6) xor FCS0(26) xor FCS0(27) xor FCS0(28) xor FCS0(30) xor FCS0(31)

FCS1(13)=datain(25) xor datain(26) xor datain(27) xor datain(29) xor datain(30) xor datain(31) xor FCS0(5) xor FCS0(25) xor FCS0(26) xor FCS0(27) xor FCS0(29) xor FCS0(30) xor FCS0(31)

FCS1(12)=datain(24) xor datain(25) xor datain(26) xor datain(28) xor datain(29) xor datain(30) xor FCS0(4) xor FCS0(24) xor FCS0(25) xor FCS0(26) xor FCS0(28) xor FCS0(29) xor FCS0(30)

FCS1(11)=datain(24) xor datain(25) xor datain(27) xor datain(28) xor FCS0(3) xor FCS0(24) xor FCS0(25) xor FCS0(27) xor FCS0(28)

FCS1(10)=datain(24) xor datain(26) xor datain(27) xor datain(29) xor FCS0(2) xor FCS0(24) xor FCS0(26) xor FCS0(27) xor FCS0(29)

FCS1(9)=datain(25) xor datain(26) xor datain(28) xor datain(29) xor FCS0(1) xor FCS0(25) xor FCS0(26) xor FCS0(28) xor FCS0(29)

FCS1(8)=datain(24) xor datain(25) xor datain(27) xor datain(28) xor FCS0(0) xor FCS0(24) xor FCS0(25) xor FCS0(27) xor FCS0(28)

FCS1(7)=datain(24) xor datain(26) xor datain(27) xor datain(29) xor datain(31) xor FCS0(24) xor FCS0(26) xor FCS0(27) xor FCS0(29) xor FCS0(31)

FCS1(6)=datain(25) xor datain(26) xor datain(28) xor datain(29) xor datain(30) xor datain(31) xor FCS0(25) xor FCS0(26) xor FCS0(28) xor FCS0(29) xor FCS0(30) xor FCS0(31)

FCS1(5)=datain(24) xor datain(25) xor datain(27) xor datain(28) xor datain(29) xor datain(30) xor datain(31) xor FCS0(24) xor FCS0(25) xor FCS0(27) xor FCS0(28) xor FCS0(29) xor FCS0(30) xor FCS0(31)

FCS1(4)=datain(24) xor datain(26) xor datain(27) xor datain(28) xor datain(30) xor FCS0(24) xor FCS0(26) xor FCS0(27) xor FCS0(28) xor FCS0(30)

FCS1(3)=datain(25) xor datain(26) xor datain(27) xor datain(31) xor FCS0(25) xor FCS0(26) xor FCS0(27) xor FCS0(31)

FCS1(2)=datain(24) xor datain(25) xor datain(26) xor datain(30) xor datain(31) xor FCS0(24) xor FCS0(25) xor FCS0(26) xor FCS0(30) xor FCS0(31)

FCS1(1)=datain(24) xor datain(25) xor datain(30) xor datain(31) xor FCS0(24) xor FCS0(25) xor FCS0(30) xor FCS0(31)

FCS1(0)=datain(24) xor datain(30) xor FCS0(24) xor FCS0(30)

If we continued to use the 8 bit FCS function 1, we would then begin to work on the next data word, datain (16–23), and to calculate the next FCS value which will be named FCS2. The equation for FCS2(31) for the next data word is the same as for FCS1(31) except that it uses a different previous FCS value 7. The equation is as follows:

FCS2(31)=datain(21) xor FCS1(23) xor FCS1(29)

However, we note from our previous equations that what we are now using as FCS1(23) was the FCS1(23) that we just previously calculated and is as follows:

FCS1(23)=datain(24) xor datain(25) xor datain(30) xor FCS0(15) xor FCS0(24) xor FCS0(25) xor FCS0(30)

Accordingly FCS1(29) was the previously calculate FCS1(29) and is as follows:

FCS1(29)=datain(27) xor datain(30) xor datain(31) xor FCS0(21) xor FCS0(27) xor FCS0(30) xor FCS0(31)

The above equations are combined to form:

FCS2(31)=datain(21) xor datain(24) xor datain(25) xor datain(30) xor FCS0(15) xor FCS0(24) xor FCS0(25) xor FCS0(30) xor datain(27) xor datain(30) xor datain(31) xor FCS0(21) xor FCS0(27) xor FCS0(30) xor FCS0(31)

The equation can then be simplified by removing redundant terms and terms which cancel each other, to form the following equation:

FCS2(31)=datain(21) xor datain(24) xor datain(25) xor FCS0(15) xor FCS0(24) xor FCS0(25) xor datain(27) xor datain(31) xor FCS0(21) xor FCS0(27) xor FCS0(31)

This process is continued for the remaining 31 equations calculating the next FCS2 value for the second 8 bit data word in the frame 13. The FCS2 equations can then be used to calculate the FCS value of 16 bits simultaneously in a batch type operation.

The process is then repeated for the third data word where the new FCS value will be named FCS3 and uses the previous FCS value FCS2. The FCS3 equations can then be used to calculate the FCS value of 24 bits simultaneously in a batch type operation.

In the preferred embodiment, the process is repeated a fourth time for the fourth data word, which will be named FCS4 and uses the previous FCS value FCS3. The FCS4 equations can then be used to calculate the FCS value of 32 bits simultaneously in a batch type operation.

In the present invention each segment does not need to be limited to 32 bits. Each segment could have more than 32 bits. If the number of bits is greater than 32 and an integer multiple of 8, then the above process of determining FCS equations for 16, 24, and 32 bits at a time is continued, such as for 40, 48, 56 and 64 or even 128 bits.

By the substituting of FSC1 into FSC2, FSC2 into FCS3 and FCS3 into FCS4, many calculations are eliminated. Once all the equations have been combined and simplified, the resulting equation for the segment FCS function 21 which operates on the 32 bit segment 15 is as follows:

FCS4(31)=datain(5) xor datain(8) xor datain(9) xor datain(25) xor datain(28) xor FCS0(25) xor FCS0(28) xor datain(23) xor FCS0(8) xor FCS0(23) xor FCS0(9) xor datain(24) xor datain(27) xor FCS0(27) xor FCS0(24) xor datain(11) xor datain(15) xor datain(29) xor FCS0(5) xor FCS0(29) xor FCS0(11) xor FCS0(15) xor datain(31) xor FCS0(31) xor datain(30) xor FCS0(30)

FCS4(30)=datain(4) xor datain(7) xor datain(8) xor datain(22) xor datain(24) xor datain(27) xor FCS0(24) xor FCS0(27) xor FCS0(22) xor FCS0(8) xor datain(26) xor FCS0(26) xor datain(10) xor datain(14) xor datain(28) xor FCS0(4) xor FCS0(28) xor FCS0(10) xor FCS0(29) xor datain(29) xor FCS0(14) xor datain(30) xor FCS0(30) xor FCS0(7) xor datain(23) xor FCS0(23)

FCS4(29)=datain(3) xor datain(6) xor datain(7) xor datain(21) xor datain(26) xor FCS0(26) xor FCS0(21) xor datain(25) xor FCS0(25) xor datain(9) xor datain(27) xor FCS0(3) xor datain(31) xor FCS0(9) xor FCS0(27) xor FCS0(13) xor FCS0(29) xor datain(29) xor datain(28) xor FCS0(28) xor FCS0(6) xor datain(22) xor FCS0(22) xor FCS0(31) xor datain(13) xor FCS0(7) xor datain(23) xor FCS0(23)

FCS4(28)=datain(2) xor datain(5) xor datain(6) xor datain(20) xor datain(25) xor FCS0(25) xor FCS0(20) xor datain(24) xor FCS0(24) xor datain(8) xor FCS0(2) xor FCS0(26) xor FCS0(8) xor FCS0(30) xor datain(27) xor FCS0(27) xor FCS0(12) xor datain(28) xor FCS0(28) xor datain(21) xor FCS0(5) xor FCS0(21) xor datain(26) xor datain(30) xor datain(12) xor FCS0(6) xor FCS0(22) xor FCS0(22)

FCS4(27)=datain(1) xor datain(4) xor datain(5) xor datain(7) xor FCS0(19) xor FCS0(23) xor datain(24) xor FCS0(24) xor datain(11) xor datain(25) xor datain(29) xor FCS0(1) xor FCS0(25) xor FCS0(29) xor datain(19) xor FCS0(26) xor datain(23) xor datain(27) xor FCS0(27) xor datain(20) xor FCS0(4) xor FCS0(20) xor datain(21) xor FCS0(5) xor FCS0(21) xor FCS0(11) xor datain(26) xor FCS0(7)

FCS4(26)=datain(0) xor datain(3) xor datain(4) xor datain(6) xor datain(22) xor FCS0(22) xor datain(23) xor FCS0(23) xor FCS0(0) xor FCS0(28) xor datain(18) xor datain(24) xor FCS0(18) xor FCS0(24) xor datain(26) xor FCS0(26) xor datain(25) xor FCS0(25) xor datain(19) xor FCS0(3) xor datain(31) xor FCS0(19) xor FCS0(31) xor datain(28) xor datain(10) xor datain(20) xor FCS0(4) xor FCS0(20) xor FCS0(10) xor FCS0(6)

FCS4(25)=datain(2) xor datain(3) xor datain(17) xor datain(21) xor FCS0(17) xor FCS0(21) xor datain(31) xor FCS0(31) xor datain(22) xor FCS0(22) xor datain(8) xor datain(11) xor datain(18) xor FCS0(2) xor FCS0(18) xor FCS0(8) xor FCS0(11) xor datain(15) xor datain(19) xor FCS0(3) xor FCS0(19) xor FCS0(15) xor FCS0(29) xor datain(29) xor datain(28) xor FCS0(28)

FCS4(24)=datain(1) xor datain(2) xor datain(7) xor datain(20) xor FCS0(16) xor FCS0(20) xor datain(30) xor datain(21) xor FCS0(21) xor datain(10) xor FCS0(1) xor FCS0(30) xor datain(16) xor FCS0(10) xor datain(14) xor datain(18) xor FCS0(2) xor FCS0(18) xor datain(27) xor FCS0(27) xor datain(28) xor FCS0(28) xor FCS0(14) xor datain(17) xor FCS0(7) xor FCS0(17)

FCS4(23)=datain(0) xor datain(1) xor datain(6) xor datain(11) xor datain(13) xor datain(17) xor datain(20) xor FCS0(17) xor FCS0(20) xor FCS0(13) xor datain(29) xor datain(9) xor datain(15) xor FCS0(0) xor FCS0(9) xor datain(26) xor FCS0(26) xor datain(11) xor FCS0(1) xor FCS0(29) xor datain(19) xor FCS0(16) xor FCS0(19) xor datain(27) xor FCS0(27) xor datain(16) xor FCS0(6) xor FCS0(15) xor datain(31) xor FCS0(31)

FCS4(22)=datain(0) xor datain(11) xor datain(12) xor datain(14) xor datain(23) xor FCS0(23) xor datain(16) xor datain(19) xor FCS0(16) xor FCS0(19) xor FCS0(11) xor datain(18) xor FCS0(12) xor FCS0(14) xor datain(27) xor datain(31) xor FCS0(27) xor FCS0(31) xor datain(9) xor FCS0(0) xor datain(29) xor FCS0(29) xor FCS0(9) xor datain(24) xor FCS0(18) xor FCS0(24) xor datain(26) xor FCS0(26)

FCS4(21)=datain(5) xor datain(9) xor datain(10) xor datain(13) xor datain(22) xor datain(18) xor FCS0(9) xor datain(24) xor datain(27) xor FCS0(18) xor FCS0(10) xor FCS0(26) xor FCS0(22) xor FCS0(27) xor FCS0(13) xor FCS0(24) xor datain(29) xor FCS0(5) xor FCS0(29) xor datain(17) xor FCS0(17) xor datain(31) xor FCS0(31) xor datain(26)

FCS4(20)=datain(4) xor datain(8) xor datain(9) xor datain(12) xor datain(17) xor datain(23) xor FCS0(8) xor FCS0(17) xor FCS0(23) xor FCS0(9) xor FCS0(26) xor datain(21) xor FCS0(12) xor FCS0(21) xor datain(28) xor datain(25) xor FCS0(25) xor datain(26) xor FCS0(4) xor FCS0(28) xor datain(16) xor FCS0(16) xor datain(30) xor FCS0(30)

FCS4(19)=datain(3) xor datain(7) xor datain(8) xor datain(11) xor FCS0(24) xor datain(25) xor FCS0(25) xor FCS0(8) xor datain(20) xor FCS0(11) xor FCS0(20) xor datain(22) xor datain(24) xor FCS0(22) xor datain(15) xor datain(27) xor FCS0(3) xor FCS0(15) xor FCS0(27) xor FCS0(29) xor datain(29) xor datain(16) xor FCS0(7) xor FCS0(16)

FCS4(18)=datain(2) xor datain(6) xor datain(7) xor datain(10) xor datain(24) xor FCS0(24) xor FCS0(10) xor datain(21) xor FCS0(21) xor datain(14) xor FCS0(2) xor FCS0(26) xor datain(26) xor datain(28) xor FCS0(28) xor FCS0(14) xor datain(15) xor FCS0(6) xor FCS0(15) xor datain(31) xor FCS0(7) xor FCS0(31) xor datain(19) xor datain(23) xor FCS0(19) xor FCS0(23)

FCS4(17)=datain(1) xor datain(5) xor datain(6) xor datain(9) xor datain(13) xor FCS0(9) xor datain(31) xor datain(20) xor FCS0(20) xor FCS0(13) xor datain(25) xor FCS0(1) xor FCS0(25) xor datain(23) xor datain(27) xor FCS0(27) xor FCS0(23) xor datain(14) xor FCS0(5) xor FCS0(31) xor FCS0(14) xor datain(30) xor FCS0(6) xor FCS0(30) xor datain(18) xor datain(22) xor FCS0(18) xor FCS0(22)

FCS4(16)=datain(0) xor datain(4) xor datain(5) xor datain(8) xor datain(12) xor FCS0(16) xor FCS0(8) xor FCS0(18) xor datain(19) xor FCS0(19) xor datain(22) xor FCS0(12) xor FCS0(0) xor datain(24) xor FCS0(18) xor FCS0(24) xor FCS0(26) xor FCS0(22) xor datain(13) xor FCS0(4) xor FCS0(16) xor FCS0(13) xor datain(30) xor FCS0(30) xor datain(21) xor datain(29) xor FCS0(5) xor FCS0(29) xor FCS0(21) xor datain(17) xor FCS0(17) xor datain(26)

FCS4(15)=datain(3) xor datain(4) xor datain(5) xor datain(7) xor datain(8) xor datain(18) xor FCS0(8) xor datain(30) xor FCS0(18) xor FCS0(30) xor datain(16) xor FCS0(16) xor datain(24) xor FCS0(24) xor datain(9) xor datain(12) xor datain(15) xor datain(27) xor FCS0(3) xor FCS0(9) xor FCS0(15) xor FCS0(27) xor FCS0(12) xor datain(20) xor FCS0(4) xor FCS0(20) xor datain(21) xor FCS0(5) xor FCS0(21) xor FCS0(7)

FCS4(14)=datain(2) xor datain(3) xor datain(4) xor datain(6) xor datain(7) xor datain(14) xor datain(15) xor datain(19) xor FCS0(29) xor FCS0(19) xor datain(29) xor FCS0(14) xor FCS0(15) xor datain(8) xor datain(11) xor FCS0(2) xor FCS0(26) xor FCS0(8) xor datain(26) xor FCS0(11) xor FCS0(3) xor datain(20) xor FCS0(4) xor FCS0(20) xor FCS0(6) xor datain(17) xor FCS0(7) xor FCS0(17) xor datain(23) xor FCS0(23)

FCS4(13)=datain(1) xor datain(2) xor datain(3) xor datain(5) xor datain(6) xor datain(7) xor datain(28) xor FCS0(28) xor FCS0(13) xor FCS0(14) xor datain(10) xor datain(25) xor FCS0(1) xor FCS0(25) xor datain(19) xor FCS0(10) xor FCS0(16) xor FCS0(19) xor datain(14) xor datain(18) xor FCS0(2) xor datain(13) xor FCS0(3) xor FCS0(31) xor FCS0(5) xor FCS0(6) xor datain(22) xor FCS0(18) xor FCS0(22) xor datain(31) xor datain(16) xor FCS0(7)

FCS4(12)=datain(0) xor datain(1) xor datain(2) xor datain(4) xor datain(5) xor datain(6) xor FCS0(12) xor datain(9) xor FCS0(0) xor FCS0(1) xor FCS0(2) xor FCS0(4) xor FCS0(5) xor FCS0(6) xor FCS0(9) xor datain(24) xor FCS0(24) xor FCS0(27) xor datain(27) xor datain(30) xor datain(13) xor datain(18) xor FCS0(13) xor FCS0(30) xor datain(21) xor FCS0(21) xor datain(17) xor FCS0(17) xor FCS0(15) xor datain(12) xor datain(15) xor FCS0(18) xor datain(31) xor FCS0(31)

FCS4(11)=datain(0) xor datain(1) xor datain(3) xor datain(4) xor FCS0(9) xor datain(17) xor FCS0(27) xor FCS0(17) xor datain(25) xor FCS0(25) xor datain(15) xor FCS0(0) xor datain(24) xor FCS0(24) xor FCS0(15) xor FCS0(1) xor datain(16) xor datain(26) xor FCS0(26) xor FCS0(16) xor datain(9) xor datain(12) xor datain(27) xor FCS0(3) xor datain(31) xor FCS0(31) xor FCS0(12) xor datain(14) xor datain(20) xor datain(28) xor FCS0(4) xor FCS0(28) xor FCS0(20) xor FCS0(14)

FCS4(10)=datain(0) xor datain(2) xor datain(3) xor datain(5) xor FCS0(26) xor datain(16) xor FCS0(16) xor datain(28) xor FCS0(0) xor FCS0(28) xor datain(29) xor FCS0(9) xor datain(14) xor FCS0(2) xor FCS0(31) xor datain(26) xor FCS0(9) xor datain(13) xor datain(19) xor FCS0(3) xor datain(31) xor FCS0(19) xor FCS0(13) xor FCS0(29) xor FCS0(5) xor FCS0(14)

FCS4(9)=datain(1) xor datain(2) xor datain(4) xor datain(5) xor datain(9) xor FCS0(9) xor datain(24) xor FCS0(24) xor FCS0(1) xor FCS0(29) xor datain(23) xor FCS0(23) xor datain(12) xor datain(18) xor FCS0(2) xor FCS0(18) xor FCS0(12) xor datain(13) xor FCS0(4) xor FCS0(13) xor FCS0(29) xor datain(11) xor FCS0(5) xor FCS0(11)

FCS4(8)=datain(0) xor datain(1) xor datain(3) xor datain(4) xor datain(8) xor datain(17) xor FCS0(8) xor FCS0(17) xor FCS0(0) xor datain(22) xor FCS0(10) xor FCS0(22) xor datain(11) xor FCS0(1) xor datain(23) xor FCS0(11) xor FCS0(23) xor datain(12) xor FCS0(3) xor datain(31) xor FCS0(31) xor FCS0(12) xor datain(28) xor FCS0(28) xor datain(10) xor FCS0(4)

FCS4(7)=datain(0) xor datain(2) xor datain(3) xor datain(5) xor datain(7) xor datain(10) xor FCS0(0) xor FCS0(28) xor FCS0(29) xor datain(24) xor FCS0(24) xor datain(22) xor FCS0(10) xor FCS0(22) xor datain(25) xor FCS0(15) xor FCS0(25) xor datain(8) xor FCS0(2) xor FCS0(8) xor datain(28) xor datain(15) xor FCS0(3) xor datain(29) xor datain(21) xor FCS0(5) xor FCS0(21) xor datain(16) xor FCS0(7) xor FCS0(16) xor datain(23) xor FCS0(23)

FCS4(6)=datain(1) xor datain(2) xor datain(4) xor datain(5) xor datain(6) xor datain(7) xor datain(11) xor datain(25) xor datain(29) xor FCS0(1) xor FCS0(25) xor datain(8) xor FCS0(2) xor FCS0(8) xor datain(14) xor datain(20) xor FCS0(4) xor FCS0(20) xor FCS0(29) xor datain(21) xor FCS0(5) xor FCS0(21) xor FCS0(11) xor FCS0(14) xor datain(30) xor FCS0(6) xor FCS0(30) xor datain(22) xor FCS0(22) xor FCS0(7)

FCS4(5)=datain(0) xor datain(1) xor datain(3) xor datain(4) xor datain(5) xor datain(6) xor datain(7) xor datain(10) xor FCS0(0) xor FCS0(28) xor datain(29) xor datain(24) xor FCS0(24) xor FCS0(10) xor FCS0(1) xor datain(19) xor FCS0(19) xor datain(13) xor FCS0(3) xor datain(28) xor datain(20) xor FCS0(4) xor FCS0(20) xor FCS0(13) xor FCS0(29) xor datain(21) xor FCS0(5) xor FCS0(21) xor FCS0(6) xor FCS0(7)

FCS4(4)=datain(0) xor datain(2) xor datain(3) xor datain(4) xor datain(6) xor FCS0(0) xor datain(29) xor FCS0(29) xor datain(24) xor FCS0(24) xor datain(25) xor FCS0(15) xor FCS0(25) xor datain(8) xor datain(11) xor FCS0(2) xor FCS0(8) xor FCS0(11) xor FCS0(12) xor datain(30) xor datain(12) xor datain(15) xor datain(28) xor datain(19) xor FCS0(3) xor datain(31) xor FCS0(19) xor FCS0(31) xor datain(20) xor FCS0(4) xor FCS0(20) xor FCS0(30) xor FCS0(6) xor datain(18) xor FCS0(18)

FCS4(3)=datain(1) xor datain(2) xor datain(3) xor datain(7) xor datain(10) xor datain(25) xor FCS0(1) xor FCS0(25) xor FCS0(10) xor FCS0(19) xor datain(27) xor FCS0(27) xor datain(8) xor datain(14) xor datain(18) xor FCS0(2) xor FCS0(18) xor datain(31) xor FCS0(31) xor FCS0(8) xor FCS0(14) xor datain(9) xor datain(15) xor FCS0(3) xor FCS0(9) xor FCS0(15) xor datain(17) xor FCS0(7) xor FCS0(17) xor datain(19)

FCS4(2)=datain(0) xor datain(1) xor datain(2) xor datain(6) xor datain(7) xor datain(9) xor FCS0(0) xor FCS0(9) xor datain(24) xor FCS0(18) xor FCS0(24) xor FCS0(1) xor datain(30) xor FCS0(26) xor FCS0(16) xor datain(8) xor datain(14) xor FCS0(2) xor datain(31) xor FCS0(31) xor FCS0(8) xor FCS0(30) xor FCS0(14) xor datain(26) xor FCS0(6) xor datain(18) xor datain(13) xor datain(16) xor datain(17) xor FCS0(7) xor FCS0(17) xor FCS0(13)

FCS4(1)=datain(0) xor datain(1) xor datain(6) xor datain(7) xor datain(9) xor datain(28) xor FCS0(0) xor FCS0(28) xor FCS0(9) xor datain(24) xor FCS0(24) xor datain(11) xor FCS0(1) xor FCS0(16) xor datain(27) xor FCS0(11) xor FCS0(27) xor datain(12) xor datain(16) xor FCS0(6) xor FCS0(12) xor datain(13) xor datain(17) xor FCS0(7) xor FCS0(17) xor FCS0(13)

FCS4(0)=datain(0) xor datain(6) xor datain(9) xor datain(10) xor datain(28) xor FCS0(0) xor FCS0(28) xor datain(29) xor FCS0(29) xor FCS0(9) xor datain(24) xor FCS0(24) xor datain(26) xor FCS0(10) xor FCS0(26) xor datain(25) xor FCS0(25) xor datain(12) xor datain(16) xor datain(30) xor FCS0(6) xor FCS0(16) xor FCS0(30) xor FCS0(12) xor datain(31) xor FCS0(31)

Figure 4:
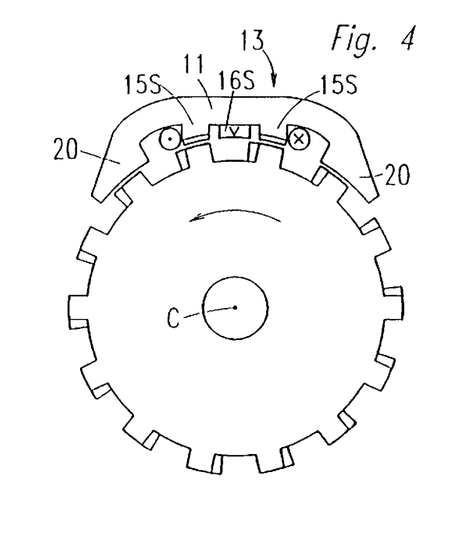
FIG. 4 is a schematic diagram of a larger view of the invention.

As shown in FIG. 2, not every segment 15 will be completely filled with frame bits. Therefore as shown in FIG. 4, the receiver means 19 has detection means 23 which detects how many frame bits are in each segment, or at least how many frame bits are in the last segment 15 of the frame.

The subsegment FCS functions are provided which operate on different numbers of segment bits 17. In the preferred embodiment, one of the subsegment FCS functions 25 operates on 24 bits at a time, subsegment FCS function 27 operates on 16 segment bits at a time, and subsegment FCS function 29 operates on 8 bits of the segment at a time. The preferred embodiment, both the number of segment bits, and the number of frame bits are an integer multiple of 8. Therefore the number of frame bits remaining in the last segment 15 will either be 8, 16, 24 or 32.

The detection means 23 detects how many frame bits are in the last segment 15, and this information is provided to an output multiplexer 31. In the preferred embodiment, the output multiplexer 31 receives the output from each of the FCS functions, and selects the output corresponding to the number of bits detected by the detecting means 23. The selected output is then put into the FCS memory 7. Each of the FCS functions in the preferred embodiment, operate on each segment and is able to access the FCS memory 7. It is also possible in another embodiment, for the output multiplexer to only enable the FCS function corresponding to the number of frame bits in the segment.

Figure 5A:
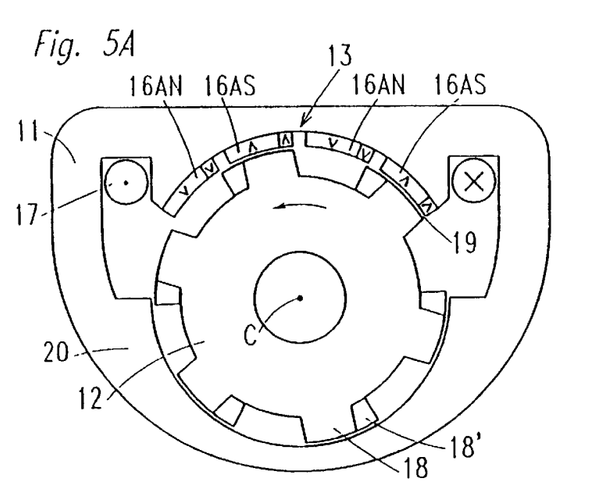
FIG. 5 is a schematic diagram of an embodiment of the present invention with an input multiplexer.
Figure 5B:
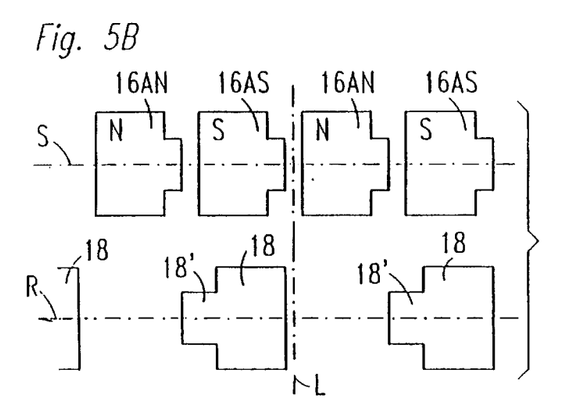

When the last segment of a frame is filled, this segment can be filled from the least significant bit or the most significant bit. When the present invention is used in network applications where the direction of filling is variable, the detection means detects which portions of the segment includes the frame bits, and input multiplexer 37 is used to pass only the frame bits to the FCS functions.

The frame 13 after being received by the receiver means 19 is also sent to a check/add means 33. The check/add means 33 also receives the FCS from the FCS memory 7 and compares the computed FCS with the FCS included in the frame, and indicates a transmission error if they do not compare.

In the preferred embodiment, the FCS equations are chosen such that when an FCS value is calculated for a frame already including an FCS value, the resulting FCS value is a specific constant, in particular "11000111000001001101110101111011". The present invention preferably checks the final calculated FCS value of frames including an FCS value to determine if the final calculated value is the specific constant.

If the frame 13 does not have an FCS, the check/add means 33 adds the computed FCS to the frame. Once the frame has a proper FCS, the frame is sent to a transmitter means 35 where it is prepared to be sent out to the computer network preferably in an Ethernet or FDDI LAN format.

Figure 6A:
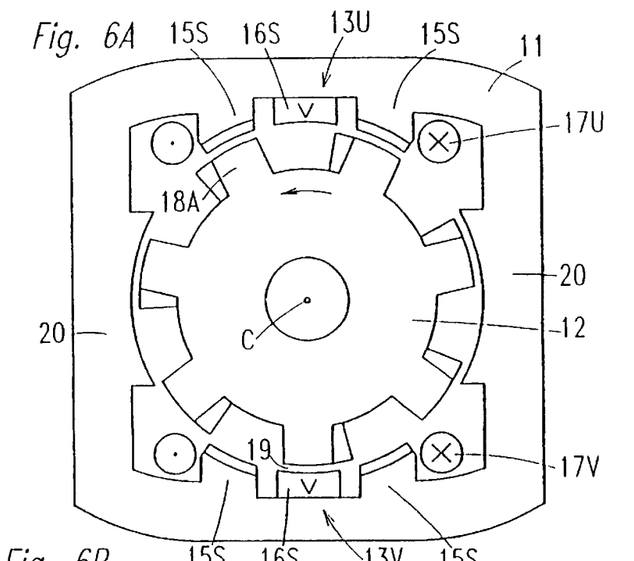
FIG. 6 is a diagram of an FDDI frame.
Figure 6B:
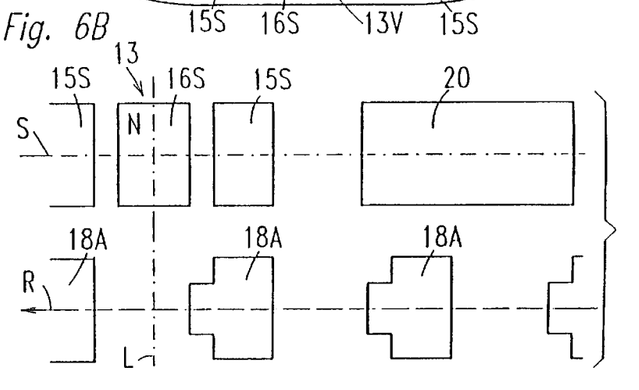
Figure 6C:
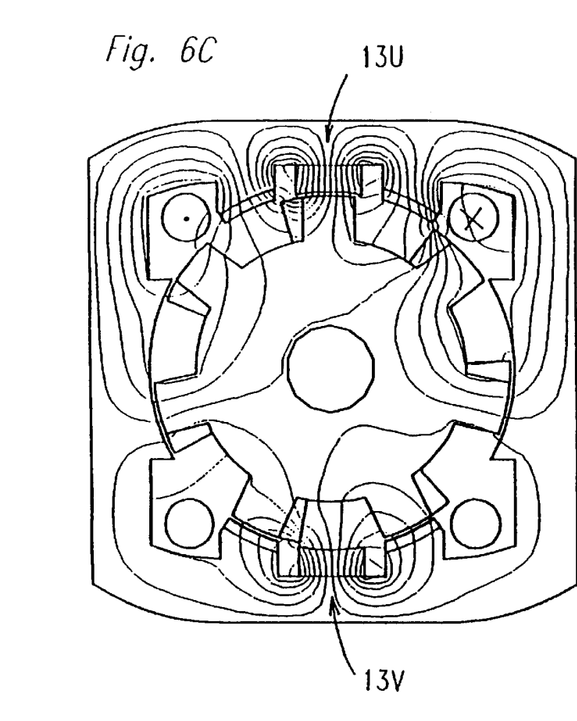
Figure 7A:
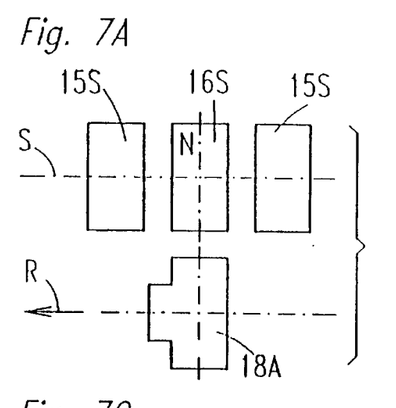
Figure 7B:
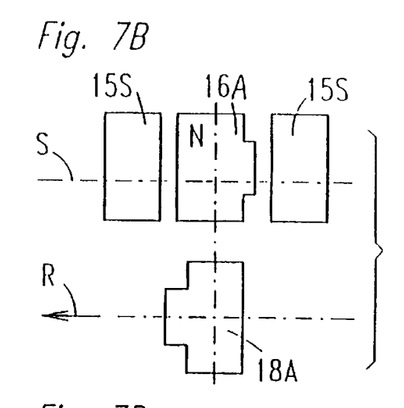
Figure 7C:
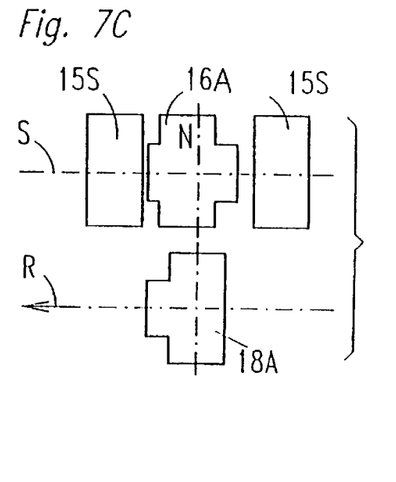
Figure 7D:
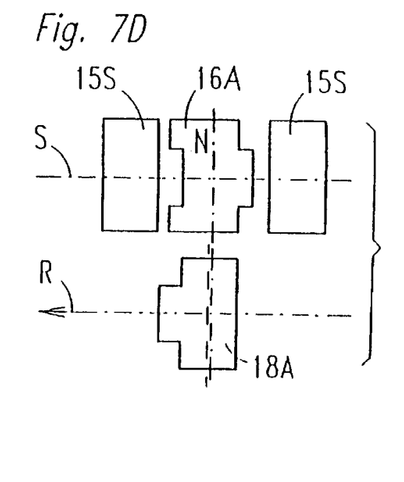

When the present invention is used in an FDDI network, a frame is composed of different portions as shown in FIG. 6, where SFS=Start of Frame Sequence INFO=Information (O or more symbol pairs)

PA=Preamble (16 or more symbols—see text)

FCS=Frame Check Sequence (8 symbols)

SD=Starting Delimiter (2 symbols)

EFS=End of Frame Sequence

FC=Frame Control (2 symbols)

ED=Ending Delimiter (1 symbol)

DA=Destination Address (4 or 12 symbols)

FS=Frame Status (3 or more symbols)

SA=Source Address (4 or 12 symbols) The frame format is used for transmitting both MAC and LLC messages to the destination station(s). It may or may not have an information field. The Media Access Control shall control the maximum frame length as required by the Physical Layer.

In the preferred embodiment, the present invention is incorporated into a network switch and only operates on that portion of the frame indicated as "FCS Coverage". Should the present invention be used in other network devices, especially those which operate on more of the frame, the dividing of the frame into the segments and the input multiplexer 37 would be modified to have the FCS functions operate on the proper portions of the frame.

All of the components needed to operate the present invention, especially as shown in FIG. 4, are preferably formed with semiconductor material in a single Application Specific Integrated Circuit (ASIC). However the present invention could be embodiment in several different circuits, with each containing one or more general purpose processors and using different materials.

While specific embodiments of the invention have been shown and described in detail to illustrate the application of the principles of the invention, it will be understood that the invention may be embodied otherwise without departing from such principles.

What is claimed is:

1. A method for generating a frame check sequence (FCS) of a transmitted frame in a computer network, the method comprising the steps of:

dividing the data frame into a plurality of segments, each of said segments having a same fixed number of bits, said fixed number of bits being greater than 8;

receiving each of said plurality of segments sequentially, all of said bits of said each segment being received simultaneously;

providing an 8 bit FCS function for calculating the frame check sequence (FCS) of 8 bits of the frame;

combining calculations of said 8 bit FCS function to calculate a FCS for said number of bits of said segment, said combining including removing redundant terms and terms which cancel each other to form a segment FCS function;

calculating an intermediate FCS for said bits of said segment in a batch operation using said segment FCS function for said each segment as said each segment is received.

2. A method in accordance with claim 1, wherein:

said number of bits is an integer multiple of 8.

3. A method in accordance with claim 1, wherein:

bits of the data frame are unevenly divided into said segments;

said calculations of said FCS function are combined to form a plurality of subsegment FCS functions, each subsegment FCS function calculating a FCS for a different number of bits of said segment;

sensing a number of said bits of the data frame in a received segment;

generating a FCS for said received segment using one of said FCS functions corresponding to said sensed number of bits.

4. A method in accordance with claim 1, wherein:

bits of the data frame are unevenly divided into said segments;

said calculations of said FCS function are combined to form a plurality of subsegment FCS functions, each subsegment FCS functions calculating a FCS for a different number of bits;

operating each of said FCS functions simultaneously on each received segment;

sensing a number of bits of the data frame in said received segment;

using a result from one of said plurality of FCS function corresponding to said sensed number of bits for calculating an FCS of a next said segment.

5. A method in accordance with claim 1, further comprising:

receiving the frame from and transmitting the frame to an Ethernet computer network.

6. A method in accordance with claim 1, further comprising:

receiving the frame from and transmitting the frame to an FDDI computer network.

7. A method in accordance with claim 1, wherein:

said 8 bit FCS function combines the FCS of the 8 bits with a next 8 bits to calculate the FCS of the 8 bits and next 8 bits, said 8 bit FCS function then continuously repeating the combining of a previous FCS with a next 8 bits to calculate the FCS of the previous and additional bits until the FCS of all bits in the frame has been calculated;

said calculating of said intermediate FCS includes combining an intermediate FCS from a previous segment with a present segment to generate an intermediate FCS for said previous and present segment, repeating said combining for said each segment as said each segment is received until all of said segments are received and the FCS of a last segment received being a final FCS.

8. A method in accordance with claim 7, further comprising:

adding said final FCS to the data frame.

9. A method in accordance with claim 7, further comprising:

comparing said final FCS to a specific constant in a frame including an FCS and indicating a transmission error if said final FCS is not equal to said specific constant.

10. A method in accordance with claim 7, wherein:

bits of the data frame are unevenly divided into said segments;

said calculations of said FCS function are combined to form a plurality of subsegment FCS functions, each subsegment FCS functions calculating a FCS for a different number of bits;

each of said FCS functions are operated simultaneously on each received segment;

a number of bits of the data frame are sensed in said received segment;

a result from one of said plurality of FCS function corresponding to said sensed number of bits are used for calculating an FCS of a next said segment;

the frame is received from and transmitted to Ethernet and FDDI computer networks;

said number of bits of the frame, said segments and said FCS functions are an integer multiple of 8.

11. A device for generating a frame check sequence (FCS) of a transmitted frame in a computer network, the device comprising:

receiver means connectable to the computer network for receiving the frame in a plurality of sequential segments, each of said plurality of segments having a segment number of bits received simultaneously, said segment number being greater than 8 bits;

segment FCS means connected to said receiver means for combining in a batch operation all of said bits of one of said segments with a previous FCS to calculate a new FCS, said segment FCS means sequentially combining each of segments of the frame in separate said batch operations until the FCS is calculated for all said segments in the frame;

transmitter means for sequentially transmitting said plurality of segments onto the computer network.

12. A device in accordance with claim 11, wherein:

said segment number in said receiver means is identical for all of said segments, said receiver means includes detection means for detecting a frame number of bits from the frame included in each said segment;

a plurality of different subsegment FCS means are connected to said receiver means, each of said subsegment FCS means calculating a new FCS for different number of bits of said segment;

a multiplexer connected to all of said FCS means, said multiplexer also receiving said frame number, said multiplexer selecting said FCS means corresponding to said frame number.

13. A device in accordance with claim 12, wherein:

all of said FCS means calculate said new FCS for each said segment;

said multiplexer means only passes on said new FCS from said selected FCS means.

14. A device in accordance with claim 11, wherein:

said transmitter and receiver means are connectable to an Ethernet computer network.

15. A device in accordance with claim 11, wherein:

said transmitter and receiver means are connectable to an FDDI computer network.

16. A device in accordance with claim 11, wherein:

said segment number and a number of bits in the frame are an integer multiple of 8.

17. A device in accordance with claim 13, wherein:

said transmitter and receiver means are connectable to an FDDI computer network and an Ethernet computer network;

said segment number and a number of bits in the frame are an integer multiple of 8;

check means is connected to said receiver means for comparing said final FCS to a specific constant in a frame including an FCS and indicating a transmission error if said final FCS is not equal to said specific constant;

addition means connected to said transmitter means for adding said new FCS to the frame.

18. A device in accordance with claim 11, further comprising:

check means for comparing said new FCS with a frame FCS included with the frame and indicating a transmission error if said final FCS is not equal to said FCS included in the frame.

19. A device in accordance with claim 11, further comprising:

addition means for adding said new FCS to the frame.

* * * * *